UNITED STATES PATENT OFFICE.

HENRY BLUMENBERG, JR., OF LOS ANGELES, CALIFORNIA, ASSIGNOR TO CHEMICAL CONSTRUCTION COMPANY, OF LOS ANGELES, CALIFORNIA, A CORPORATION OF CALIFORNIA.

PROCESS OF PRODUCING POTASSIUM SALTS.

1,296,459.  Specification of Letters Patent.  Patented Mar. 4, 1919.

No Drawing.   Application filed December 4, 1917.   Serial No. 205,449.

*To all whom it may concern:*

Be it known that I, HENRY BLUMENBERG, Jr., a citizen of the United States, residing at Los Angeles, in the county of Los Angeles and State of California, have invented new and useful Improvements in Processes of Producing Potassium Salts, of which the following is a specification.

My invention relates to a process of extracting potassium salts from minerals, such as feldspar and the like which contain potassium in an insoluble form.

In my United States Patent No. 1,214,003, under date of January 30th, 1917, I have described a process of extracting potassium from feldspar and the like by heating the same with sodium nitrate in a closed retort until fusion takes place and the nitric oxids have been expelled. The resultant mass contains potassium in an amenable form, which may be extracted by treatment with mineral acid, such as sulfuric acid, and refined.

I have invented a process for extracting potassium salts from feldspar and the like which is applicable where there is an available supply of sulfuric dioxid, and such supply is often found where there are metallurgical furnaces in operation.

My invention consists in the use of an inexpensive reagent, sodium carbonate, and the treatment with sulfur dioxid in the extraction of potassium salts from feldspar and the like as hereinafter described and claimed.

I take orthoclase, pulverized so that the same will pass through a 200 mesh screen, mix the same intimately with powdered sodium carbonate in the proportion of 1 part of orthoclase to 2 parts of sodium carbonate. The mixture is placed in a closed retort and heated to a temperature of 800° to 900° C. until complete fusion takes place and all the carbon dioxid is driven off.

The fused mass is now pulverized, mixed with water to form a magma, and treated with sulfur dioxid, which may be in the form of waste gases from metallurgical furnaces. The sulfur dioxid will combine with the sodium and potassium in the mass, forming sodium sulfite and potassium sulfite, respectively; hydrous silicates are also formed. The mass is now dehydrated, thereby rendering the gelatinous silicates anhydrous and insoluble. The mass is now digested with water, preferably hot, and filtered through a filter press or the like. The filtrate contains a sodium sulfite and potassium sulfite, which may be separated from each other by the well known process of filtration.

In the foregoing examples I have described the treatment of feldspar with sodium carbonate. However, it is not essential that a sodium salt be used to render the potassium in the feldspar amenable to further treatment, and the present process may be used in connection with any treatment of feldspar whereby the potassium therein is rendered amenable.

I claim:

1. A process of extracting potassium salts from minerals containing potassium in an insoluble form, comprising mixing the powdered mineral with a reagent capable when fused therewith to render the potassium amenable, heating the mass until fusion takes place and the volatile gases are driven off, mixing the fused mass with water, treating it with sulfur dioxid, and separating the potassium sulfite from the mass.

2. A process of extracting potassium salts from minerals containing potassium in an insoluble form, comprising mixing the powdered mineral with sodium carbonate, heating the mass until fusion takes place and the carbon dioxid is driven off, mixing the mass with water, treating it with sulfur dioxid, and separating the potassium sulfite from the mass.

3. A process of extracting potassium salts from silicates containing potassium in an insoluble form, comprising mixing the powdered silicate with sodium carbonate, heating the mass until fusion takes place and the carbon dioxid is driven off, mixing the mass with water, treating it with sulfur dioxid, dehydrating the mass to render the silicates insoluble, mixing water therewith, and separating the potassium sulfite from the mass.

In testimony whereof I have signed my name to this specification.

HENRY BLUMENBERG, JR.